Jan. 7, 1930.　　　　S. E. MANNING　　　　1,742,552
CRANK ARM
Filed July 11, 1927　　　2 Sheets-Sheet 1

Inventor
Sanford E. Manning
By
Hardway & Cathey
Attorneys

Jan. 7, 1930.  S. E. MANNING  1,742,552
CRANK ARM
Filed July 11, 1927   2 Sheets-Sheet 2
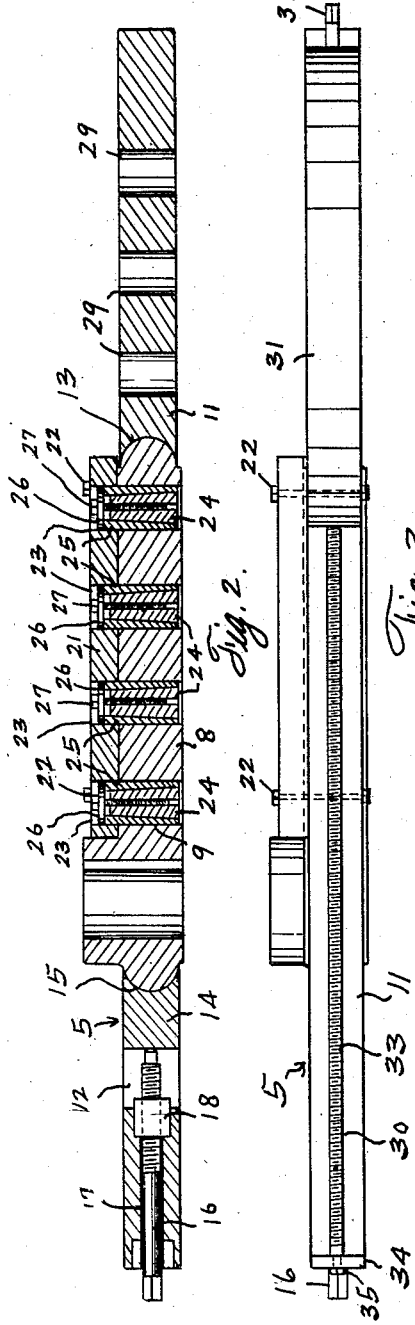
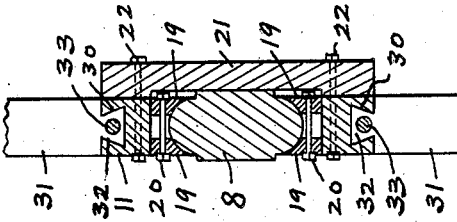
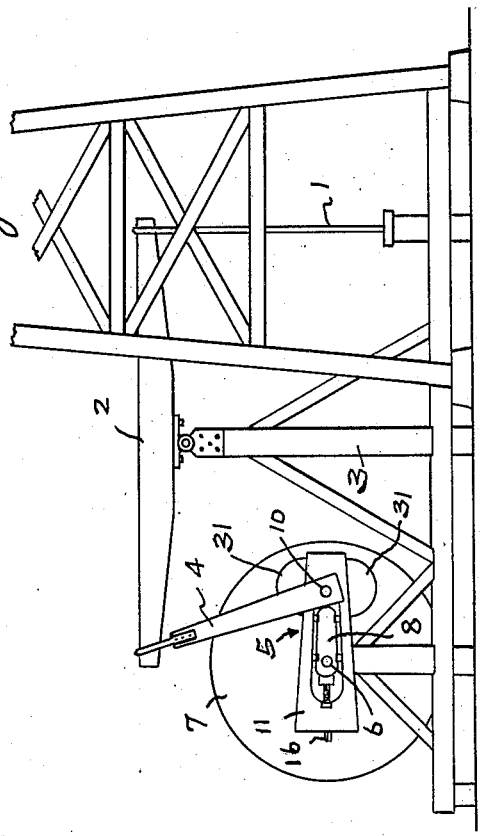
Inventor
Sanford E. Manning
By Hardway Cathey
Attorneys Patented Jan. 7, 1930

1,742,552

UNITED STATES PATENT OFFICE

SANFORD E. MANNING, OF SMACKOVER, ARKANSAS

CRANK ARM

Application filed July 11, 1927. Serial No. 204,794.

This invention relates to new and useful improvements in a crank arm.

One object of the invention is to provide an improved type of crank arm particularly adapted for use in deep well pumping rigs and embodying means for counterbalancing the weight of the pump rods in pumping the wells.

Another object of the invention is to provide a novel type of crank arm adapted to be fixed to the crank shaft of the rig and operatively connected with the walking beam, pump jack, or other means for reciprocating the pump rod, said crank arm being equipped with counterbalancing means for counterbalancing the pump rods, said counterbalancing means being adjustable so as to adapt the crank arm for use in handling loads of variable weights.

A further feature of invention resides in the provision of novel, efficient and practical means for adjusting the counterbalancing weights along the crank arm, so as to vary their influence, when in active position, or so as to move them into inactive, or neutral position.

With the above and other objects in view this invention has particular relation to certain novel features of construction, operation and arrangement of parts, an example of which is given in this specification and illustrated in the accompanying drawings, wherein:—

Figure 2 shows a longitudinal sectional view thereof, taken on the line 2—2 of Figure 1.

Figure 3 shows an edge view thereof.

Figure 4 shows a fragmentary cross sectional view taken on the line 4—4 of Figure 1, and Figure 5 shows a side view of a pumping rig, embodying, and illustrating the use of, the improved type of crank arm.

Figure 1:
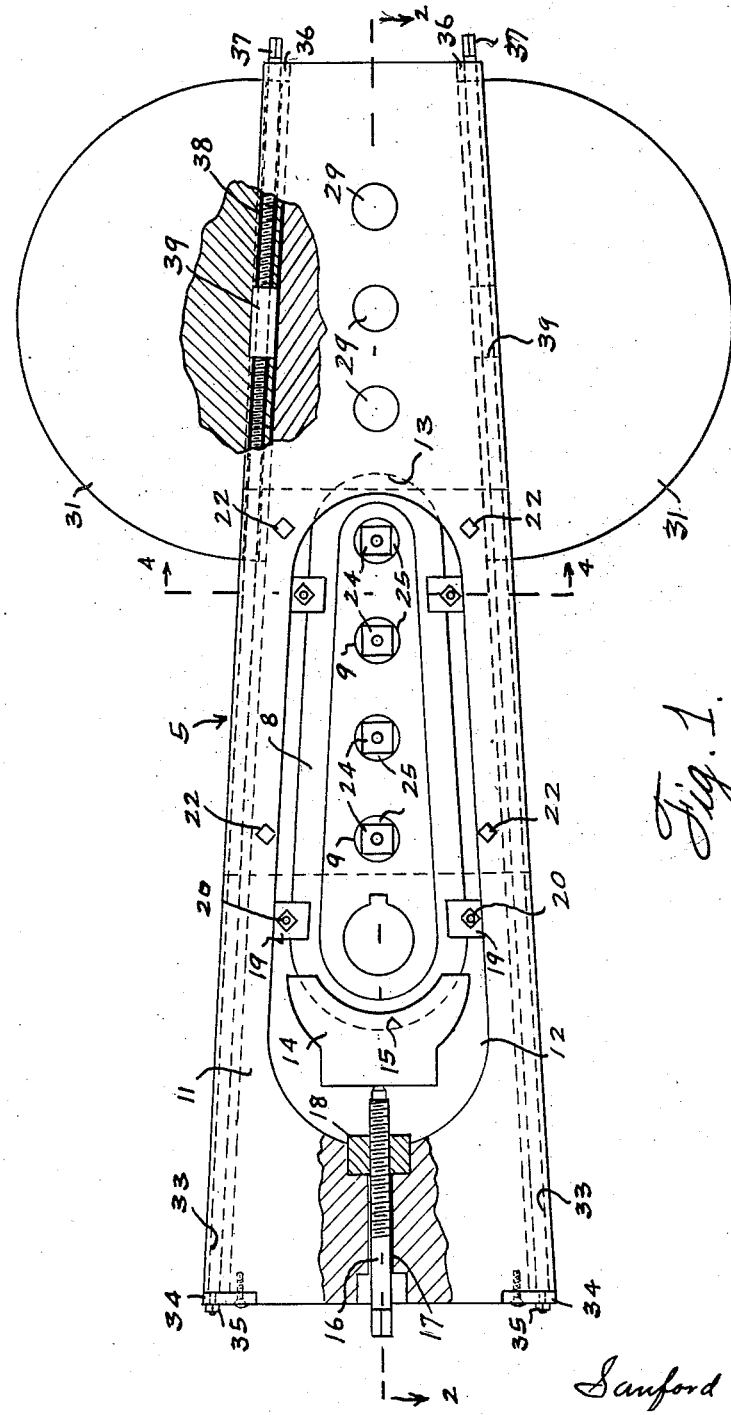
Figure 1 shows a side elevation, partly in section, of the crank arm embodying the invention.

Referring now more particularly to the drawings wherein like numerals of reference designate similar parts in each of the figures, the numeral 1 designates the pump rod which extends down into the well and through which the traveling valve or plunger of the pump is reciprocated. The upper end of the rod 1 is connected to a walking beam 2, which is pivotally mounted on the standard 3. The walking beam is reciprocated through a conventional pitman 4 which is connected to one end of the beam and which in turn is driven by the crank arm 5 which is fixed on the crank shaft 6. This crank shaft may be driven through a band wheel 7, as shown. The load of the pump rod resists the rotation of the crank arm upon upstroke of said rod but accelerates the rotation of the crank arm on down stroke of the rod resulting in an uneven jerking motion incident to the dropping of the rod by gravity with consequent injury to the associated parts. In order to overcome the irregular movement of the crank arm I have provided a counterbalancing means on the crank arm for the purpose of counterbalancing the load of the pump rod 1. The counterbalancing means provided are adjustable along the crank arm so as to counterbalance rods of different weights and said counterbalancing means may be adjusted into inactive or neutral position if desired. A specific description of one form of the improved type of crank arm is as follows.

Fixed upon one end of the crank shaft 6 there is the conventional type of arm 8 provided with the bearings as 9 to receive the wrist pin 10 by means of which the arm 8 may be connected to the pitman. This arm 8 is the conventional type of crank arm now employed in drilling rigs and may be used for operating the walking beam under conditions where a counter balance for the load of the pump rod is not required. The numeral 11 designates a supplemental arm having an elongated slot 12 cut transversely therethrough conforming in shape to and adapted to receive the arm 8, being of somewhat larger dimensions than said arm 8. At one end the slot 12 is provided with a groove like bearing 13 designed to receive the free end of the arm 8 which is of oval contour and disposed opposite the other end of the arm 8 there is an arcuate yoke 14 arranged in the slot 12, one side of which has an arcuate groove 15 adapted to receive the opposing end of arm 8 and a clamp screw 16 is fitted through the bearing 17 in the adjacent end of the arm 11 and is threaded through a bearing block 18 carried by said last mentioned arm and the inner end of the clamp screw abuts against the outer side of the yoke 14 and clamping means is thus provided for securing the inner and outer arms 8 and 11 together. A plurality of pairs of wedge shaped blocks 19 may be provided and disposed between the arms 8 and 11 on each side and clamped together by means of suitable clamp bolts 20, as indicated in Figure 4 providing additional means for anchoring said arms together. The numeral 21 designates an anchor plate which is bolted to the inner side of the supplemental arm 11 by means of the corner bolts 22 and the arm 8 is securely fastened to this anchor plate 21 by means of suitable expansion bolts which are fitted through the bearings 9 and through aligned bearings 23 in said anchor plate. These expansion bolts will now be described.

Each of said bolts is preferably formed of a tapering wedge shaped core as 24, preferably square in cross section and fitted against the sides of each core are the wedge shaped segments 25 whose outer surfaces are arcuate and whose inner surfaces bear against the corresponding sides of said core. Fitted snugly into the bearings 23 are the circular washers 26 which rest against the opposing ends of the segments 25 and an actuating screw 27 is fitted through each washer 26 with its head bearing against said washer, said screw being threaded into the corresponding core 24. When the expansion bolts are inserted into the bearings 9 and 23 the ends of the cores 24 are spaced from the corresponding opposing washers 26 and by turning the screws 27 appropriately said cores may be tightened up against the segments 25 causing an expansion of said segments and thus securely anchoring said expansion bolts in place. These bolts will thus secure the supplemental arm 11 against any side movement relative to the arm 8. The outer or free end of the arm 8 is provided with a plurality of bearings as 29 for the wrist pin 10 thus providing for a long stroke to the pump rod.

The arm 11 has dovetailed grooves, or mortises 30, 30, in each edge extending from end to end thereof and weights 31, 31 have dovetailed ribs, or tenons, 32, 32 which run in said mortises. Adjusting screws 33 are located in said grooves 30. At one end each screw 33 is reduced and fitted through a bearing plate 34, anchored to one end of the arm 11, said reduced end being threaded to receive a nut 35 to anchor the corresponding rod against detachment. The other ends of said screws 33 have bearings in the fixed blocks 36, secured to the arm 11 and said ends have projecting polygonal sections 37 to receive a socket wrench by means of which the screws may be turned. Each weight 31 has a bearing 38 through which the corresponding rod 33 passes and a section of each rib or tenon 32 is cut away providing space for an actuating block 39 through which the corresponding shaft 33 is threaded. It is obvious that by turning the shafts 33 the weights 31 may be adjusted as desired along the crank arm.

The weights 31 are preferably platelike in form and are of substantially the same thickness as the arm 11 with their outer ends rounded. Two weights are shown, although a single weight may be employed if desired. When a heavy load is to be balanced the weights should be adjusted toward the outer or free end of the crank arm away from the shaft 6 but in case of light load the weight should be adjusted nearer the shaft. In case the shaft 6 is run with the pitman detached from it, or in case the device is used for elevating the rods or other load from the well the weights 31 should be adjusted to such position that the central line passing through them will pass also through the shaft 6, that is they should be balanced about said shaft.

While I have herein shown one embodiment of the invention for illustrative purposes and have disclosed and described in detail the construction and arrangement incidental to one specific embodiment thereof it is to be understood that the invention is limited neither to its specific embodiment therein shown nor to the mere details or relative arrangement of parts, but that extensive deviations from the illustrated form or embodiment of the invention may be made without departing from the principles thereof.

What I claim is:—

1. A crank arm including an outer arm having an oblong opening, an inner arm in said opening, clamping means for detachably securing said arms together, an anchor plate anchored to the outer arm and means for anchoring the inner arm to said plate.

2. A crank arm comprising an outer arm and an inner arm to which the outer arm is detachably secured, a weight carried by the outer arm and adjustable therealong, end bearings carried by the outer arm, a threaded shaft rotatable in said bearings and means connected to the weight and through which the shaft is threaded.

3. A crank arm comprising an outer arm and an inner arm to which the outer arm is detachably secured, a weight associated with said outer arm, said weight and outer arm being provided, one with a lengthwise mortise and the other with a tenon adapted to move in said mortise and means for adjusting the weight along said arm.

4. A crank arm comprising an outer arm and an inner arm to which the outer arm is detachably secured, a weight associated with said outer arm, said weight and outer arm being provided, one with a lengthwise mortise and the other with a tenon adapted to move in said mortise and means for adjusting the weight along said arm, said adjusting means including a screw shaft rotatably mounted on the outer arm and means operatively connecting said shaft with said weight.

5. A crank arm including an outer arm having an oblong opening one end of which is formed into a bearing, an inner arm in said opening, one end of which is fitted into said bearing, a yoke, clamp means carried by the outer arm and adapted to clamp the yoke against the opposing end of said inner arm, a weight adjustable on the outer arm and a threaded shaft operatively connected with the weight through which said weight may be adjusted, along said outer arm.

In testimony whereof I have signed my name to this specification.

SANFORD E. MANNING.